United States Patent [19]
Euler

[11] 3,950,115
[45] Apr. 13, 1976

[54] PLASTICS ROTOR BLADE

[75] Inventor: August Hanns Leonhard Euler, Aix en Provence, France

[73] Assignee: Societe Nationale Industrielle Aerospatiale, Paris, France

[22] Filed: Nov. 26, 1974

[21] Appl. No.: 527,291

[30] Foreign Application Priority Data
Nov. 30, 1973 France ............................ 73.42730

[52] U.S. Cl. ................ 416/226; 244/123; 416/230; 416/241 A
[51] Int. Cl.² ...................................... B64C 27/46
[58] Field of Search ............ 244/123; 416/248, 227, 416/230, 234, 239, 241 A, 226

[56] References Cited
UNITED STATES PATENTS

| | | |
|---|---|---|
| 2,690,810 | 10/1954 | Doussain et al. ................ 416/248 X |
| 2,868,439 | 1/1959 | Hampshire et al. ........... 416/230 UX |
| 3,476,484 | 11/1969 | Brunsch .......................... 416/248 X |
| 3,603,701 | 9/1971 | Tarcrynski ...................... 416/230 X |
| 3,669,566 | 6/1972 | Bourquardez et al. ............. 416/230 |
| 3,762,834 | 10/1973 | Bourquardez et al. ......... 416/230 X |
| 3,782,856 | 1/1974 | Salkind .......................... 416/230 X |

FOREIGN PATENTS OR APPLICATIONS
1,166,700   10/1969   United Kingdom ............. 416/241 A Primary Examiner—Trygve M. Blix
Assistant Examiner—Galen L. Barefoot
Attorney, Agent, or Firm—Karl W. Flocks

[57] ABSTRACT

A plastics rotor blade, particularly for a helicopter, is formed with elongate filaments or rovings forming a loop for securing to a hub pin. The loop contains a metal socket secured to an extension extending between the loop walls.

7 Claims, 7 Drawing Figures

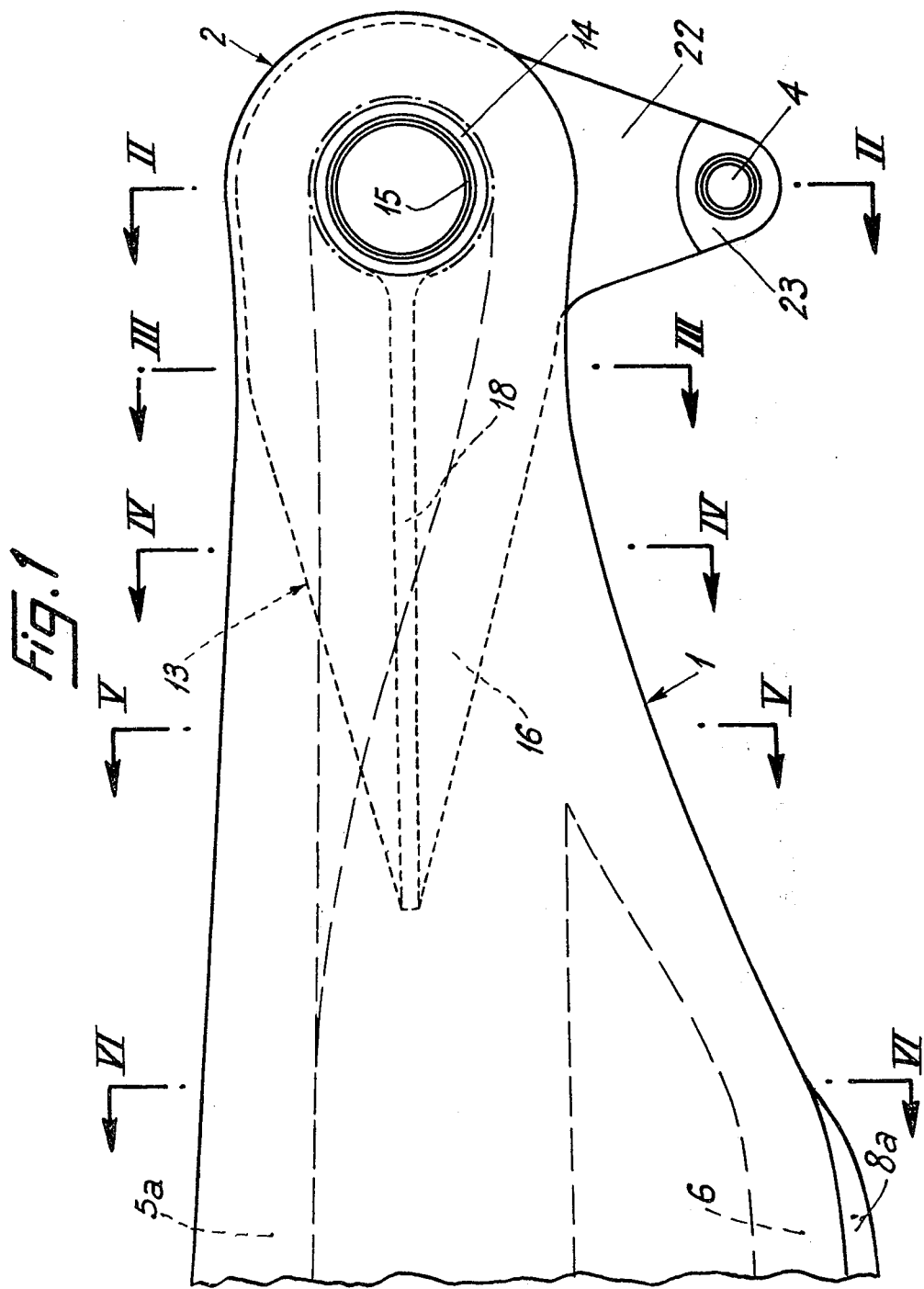

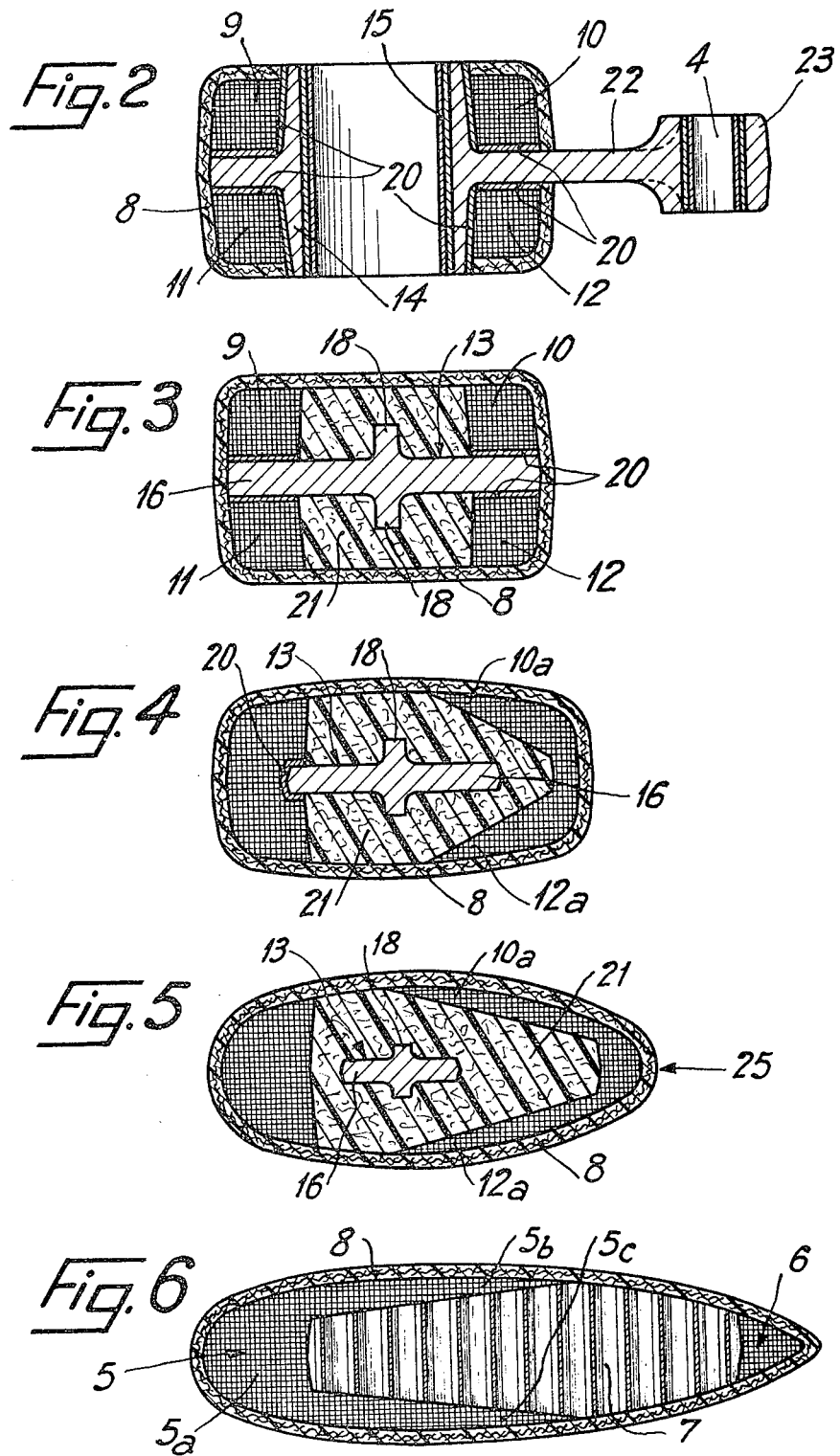

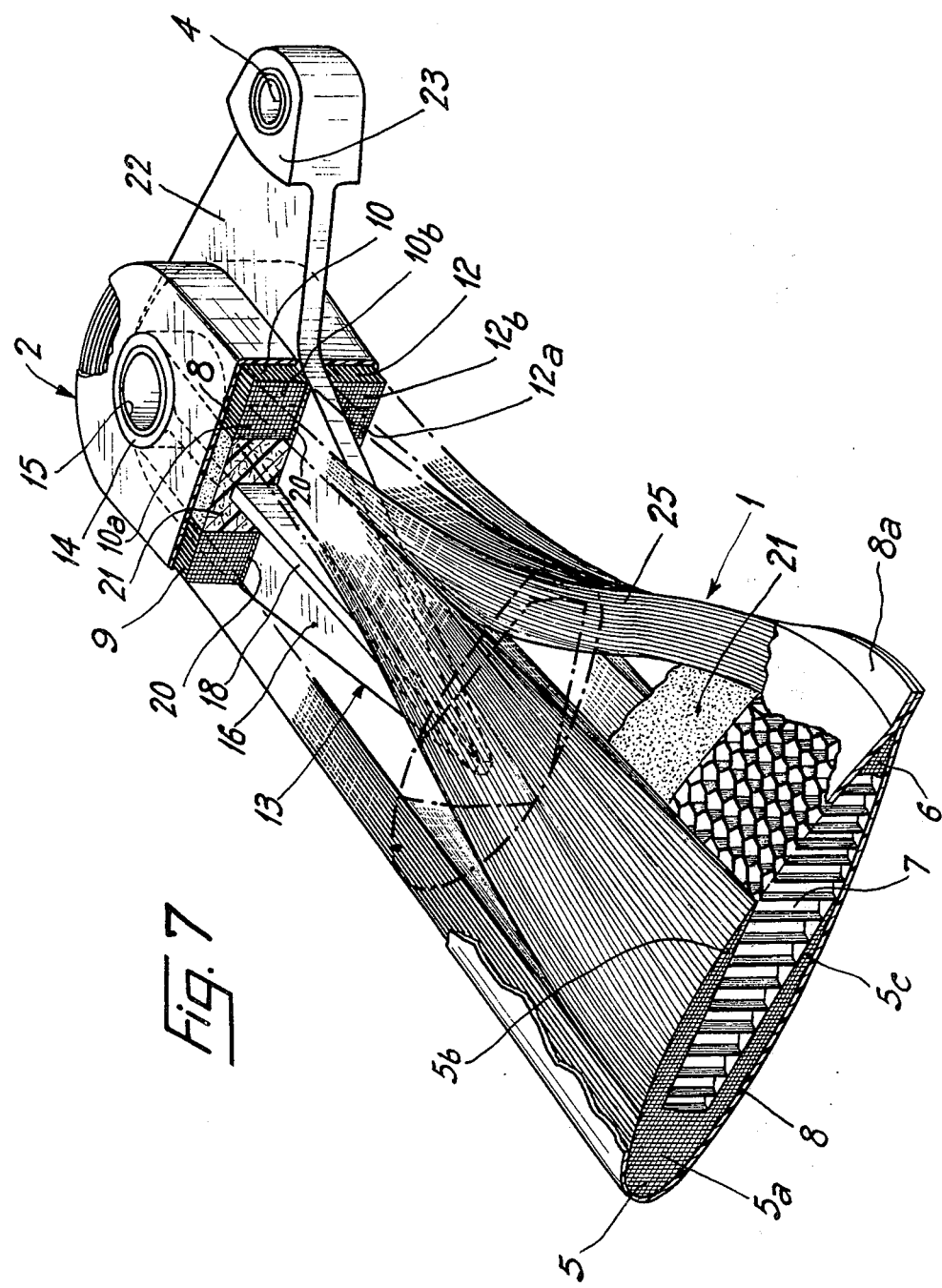

PLASTICS ROTOR BLADE

This invention relates to a plastics rotor blade, more particularly to devising the blade root for connection to the rotor hub.

Helicopter rotor blades are known whose strength or resistance structure is embodied by longitudinal mineral filaments or rovings which are mainly distributed at the blade leading and trailing edges and in which a lightweight filling core is embedded. To connect such a blade to the rotor hub it has already been suggested to use continuous rovings from the leading edge to the trailing edge, the rovings thus forming a looped skein which extends around a hub attachment pin. The rovings in a blade of this kind therefore experience mainly tensile stressing in a rotor blade experiencing centrifugal force in operation, but the zone where the blade is connected to the hub also experiences a variety of static and dynamic forces, more particularly bending and twisting forces. Such forces produce stresses which, since they act perpendicularly to the rovings, are not borne thereby but are borne only by the bonding resin, so that the bond tends to loosen and the blade root/hub assembly tends to break up.

To strengthen this connection French Patent Specification No. 1,544,344 discloses the idea of a metal box extending around the looped skein and also enveloping some of the blade root. Since the elasticity modulus of the rovings differs from that of the casing, such patent specification proposes the interposition between the outside surface of the rovings skein and the casing inside surface of a layer of deformable substance permitting relative movement between the two parts of the complete system. The risk of damage by forces other than longitudinal forces therefore still exists; also, the rovings and their potting or enveloping experience very severe fatigue at the exit from the casing.

To increase the strength of the blade-to-hub bond, French Patent Specification No. 1,581,324 suggested dividing the looped skein into four looped thongs or strips or the like, such loops being distributed at the four corners of a rectangle and being secured to the hub individually by pins. Bending moments are therefore borne in the two main planes by parallel roving thongs some of which are in tension and the others in compression and which are separated from one another, so that the complete system has increased resistance to bending moments, since two parallel thongs thus separated form a kind of beam whose section modulus is proportional to the spacing between them. Unfortunately, there is no provision for keeping the compressed and tensioned thongs apart from one another and so this construction can be destroyed by shearing; also, the four attachment points which are bound to be stressed unequally form the weak points of the system.

The invention obviates these disadvantages, making it possible to transfer any kind of force acting on the blade at its attachment to the hub and also making it possible for the connecting portion between the attachment and the blade to withstand such forces.

A blade whose strength structure consisting of longitudinal rovings forming towards the blade root a rigid skein loop enabling the blade to be secured by a pin to the hub, comprises according to the invention, a metal mounting member in the form of a socket through which the pin extends and around which the loop extends and which is rigidly secured in its central portion to a tapering lateral extension engaged between the two roving parts interconnected by the loop, such extensions being assembled thereto by way of a compact filling consisting of a mineral loading agent and an adhesive, the filling being connected to the blade hub, the rovings being applied to the filling as they separate from the blade.

Preferably, the extension has in the direction of the blade chord a flat portion which extends around the socket, forming a plate perpendicular to the axis thereof, and which tapers towards the blade.

Preferably, the flat portion has on each of its surfaces a central rib connected to the socket and tapering as it extends away therefrom so that the cross-section of the socket extension is cruciform and tapers towards the blade.

Preferably, to provide a satisfactory connection between the rovings, the filling and the metal mounting member, the same is covered by an intermediate roving layer consisting of synthetic fibre and resin fabrics and stuck during the moulding of the system to the metal mounting member and to the filling and to the rovings. In such a system the metal mounting member and the filling act as spacers between the thongs of roving when the same are compressed or tensed by bending moments, so that two "sheets" of rovings separated by such spacers can form a beam which has very high bending strength and which can also withstand transverse shearing forces.

Also, for the transmission of the transverse forces from the blade to its attachment, the difference between the elasticity moduli of the roving-reinforced laminate, the filling and the metal mounting member is progressively compensated for by the tapering of the extension, since the same can in its tapering portion follow the relatively large amplitude deformations of the laminated structure (rovings, resin, filling), while its increasing rigidity towards the hub gradually reduces such deformations yet transfers to the pin the forces producing such deformations.

The risks of the moulded-together parts becoming unstuck are therefore obviated and the complete system experiences stressing like a single homogeneous member without special stressing of any particular one of its constituent elements.

The accompanying drawings will show clearly how the invention can be carried into effect.

In the drawings:

FIG. 1 is a plan view of the root of a helicopter rotor blade made of a plastics reinforced by high-strength artificial fibres;

FIGS. 2 to 6 are sections on the lines II — II, III — III and so on up to VI — VI of the blade root shown in FIG. 1, and FIG. 7 is a perspective view of the blade root with parts broken away.

A blade base or root 1 shown in the drawings consists mainly of glass textile reinforced synthetic resin. Its terminal parts towards the rotor centre is shaped as a pivot 2. A blade of this kind is connected to the corresponding part of the hub (not shown) in known manner by way of a cylindrical main pin engaged in the pivot and of a secondary and narrower pin engaged in bore 4 in a lateral projection or lug 22 of the blade root; the secondary pin connection serves to prevent the blade from rotating around the main pin.

The straight part of the blade (FIGS. 6 and 7) is in the shape of a wing profile and is embodied in known manner by rovings placed longitudinally of the blade main axis and distributed in two groups. The bigger and C-shaped group 5 forms the leading edge and the second group 6 is placed at the trailing edge. The space between the two groups of rovings is taken up by a light porous filling 7, e.g. of foamed polyurethane or of a metal or plastics honeycomb. The blade and the blade root system is enveloped in a "skin" 8 of laminated fabric which tightly envelops the constituent elements of the blade and forms a stressed skin system. The two edges of the skin applied to one another form the ridge 8a of the trailing edge.

The blade end pivot 2 is embodied by the loop formed by the continuous rovings around the main pin. A metal mounting member 13 is provided in the loop between the rovings which are separated into four substantially bifurcate portions, equal thongs or strips or the like 9 – 12. Member 13 has a socket 14 having an inner ring 15 for the main pin; rigidly secured to socket 14 is a tapering cruciform extension comprising a plate 16 perpendicular to the socket at its centre and two ribs 18 which are perpendicular to the plate 16 and rigidly secured thereto and to the socket 14 but only on the blade side. The tapering plate 16 separates the four thongs 9 – 12 of the loop. The width and thickness of the ribs 18 are gradually decreasing, as can be gathered from FIGS. 3 to 6 and 7.

Inserted around the socket 14 and against the arms of the member 13 in contact with the thongs 9 – 12 are spacers or shims or the like 20 embodied by a stack of synthetic resin impregnated glass fabrics, the integers 20 being highly adhesive and shear-resistant.

In the portion between the hub and the blade the rovings of the thongs 9 and 11 extend in a straight line and form the central portion 5a of the C-shaped section 5. The two ends 5b, 5c thereof come from the portions 10a and 12a of the thongs 10, 12 respectively which are progressively turned flat on the blade surfaces. Consequently, the body of rovings rigidly secured to the leading edge can be much larger than the body of rovings forming the trailing edge although the four thongs or the like are of substantially the same cross-section as one another.

After bending the thongs of the portions 10b, 12b form the trailing edge 25 of the intermediate portion and of the ordinary portion 6 of the blade.

In the intermediate portion the gaps around the tapered metal-member portion disposed towards the inside of the blade inside the skin 8 and between the thongs receive a filling 21 which can withstand compression and shear and which is e.g. short fibres or glass chips embedded in resin.

The various items, namely the integers 13, 20, 9 – 12 and 8, are assembled by sticking, pressure moulded and hot polymerized.

In a system of this kind, transmission to the member 13 of tensile forces and twisting and bending moments coming from the blade occurs gradually with no rubbing or sliding between the rovings, the members 20 and the member 13. The tapering part of the member 13 provides a transition between the relatively flexible blade root portion adjacent the blade and the attachment by the main pin to the hub.

As the forces are transmitted to the member 13, the elongation difference to be absorbed by the members 20 decreases, becoming zero at the loop around the socket 14. Also, bending moments are transmitted by a uniformly distributed bearing of the rovings on the filling 21 and compression thereof.

Near the main pins arm 16 of member 13 has a lug or the like 22 terminating in reinforcement 23 through which bore 4 extends. Blade drag moments can be transmitted via lug 22 to the rotor blade.

The pivot 23 can be connected to the hub either directly, if the blade is not required to rotate at all around the main pin, or by way of a damper, if the blade is adapted to pivot freely around the main pin, or by way of a frequency matching facility if blade drag oscillations around the main pin are attenuated by a dampened resilient restoring system.

The invention is of use for helicopter rotors.

I claim:

1. A high strength rotor blade comprising longitudinal rovings forming a rigid skein loop in the vicinity of the blade base or root thereby enabling said blade to be secured by a pin to a hub member, said blade further comprising a metal mounting member including a socket through which said pin may extend and a longitudinal extension of tapering configuration, said rovings extending away from said loop into bifurcate portions, said longitudinal rovings being arranged in said blade with said loop extending around said socket and said longitudinal extension being disposed between and in engagement with said bifurcate portions of said rovings, said rovings and extension being assembled in said blade by a compact filling consisting of a mineral loading agent and an adhesive, the filling being connected to the blade hub, the rovings being applied to the filling as they extend away from said blade root and separate into bifurcate portions.

2. The improved blade according to claim 1 wherein the extension has in the direction of the blade chord a flat portion which extends around the socket, forming a plate perpendicular to the axis thereof, and which tapers towards the blade.

3. The improved blade according to claim 2, wherein the flat portion has on each of its surfaces a central rib connected to the socket and tapering as it extends away therefrom so that the cross-section of the socket extension is cruciform and tapers towards the blade.

4. The improved blade according to claim 1, wherein the metal mounting member is covered by an intermediate layer of high-stick shear-resistant laminate.

5. The improved blade according to claim 1, wherein the filling consists of synthetic resin and small glass fragments.

6. The improved blade according to claim 1 wherein a portion of the rovings extending from the loop towards the trailing edge comes to the surface of the filling towards the leading edge.

7. The improved blade according to claim 1, wherein the metal mounting member has a projecting lug terminating in a bore which extends parallel to the socket bore and which receives an auxiliary pin preventing the blade from rotating around the main pin.

* * * * *